United States Patent
Inagaki et al.

[15] 3,656,017
[45] Apr. 11, 1972

[54] ELECTRIC SYNCHRONOUS MACHINE HAVING A COMB-SHAPED POLE TYPE ROTOR

[72] Inventors: Junpei Inagaki; Hitoshi Marumo, both of Yokohama, Japan

[73] Assignee: Tokyo Shibaura Electric Co., Ltd., Kawasaki-shi, Japan

[22] Filed: Sept. 1, 1970

[21] Appl. No.: 68,730

[30] Foreign Application Priority Data

Sept. 1, 1969 Japan..................................44/68952

[52] U.S. Cl..................................310/90, 310/168, 310/263
[51] Int. Cl......................................................H02k 5/16
[58] Field of Search.....................310/90, 168, 263, 156, 68, 310/162–164

[56] References Cited

UNITED STATES PATENTS

| | | | |
|---|---|---|---|
| 3,321,652 | 5/1967 | Opel | 310/263 X |
| 3,319,100 | 5/1967 | Erickson | 310/263 X |
| 3,446,150 | 5/1969 | Dee | 310/90 X |
| 3,302,048 | 1/1967 | Gray | 310/90 |
| 3,016,273 | 1/1962 | Benoit | 310/90 X |
| 2,937,294 | 5/1960 | Macks | 310/90 |
| 2,998,999 | 9/1961 | Morser et al. | 310/90 X |

*Primary Examiner*—D. F. Duggan
*Attorney*—Oblon, Fisher & Spivak

[57] ABSTRACT

An electric synchronous machine includes a comb-shaped rotor which is rotatably mounted in a centered bore of a stator. The opposite end portions of the rotor respectively extend through cylindrical tubular members provided on end brackets of the synchronous machine to maintain a small annular air gap therebetween. Exciting coils are wound around the cylindrical tubular members to effect a D.C. excitation of the comb-shaped pole members of the rotor. The magnetic fluxes generated by the exciting coils are passed through the annular air gap to the rotor. The cylindrical tubular members also include fluid paths therein through which a pressurized fluid is ejected into the annular air gap to thereby float the rotor above the inner surface of the cylindrical tubular members during the rotation of the synchronous machine.

6 Claims, 1 Drawing Figure

Patented April 11, 1972
3,656,017
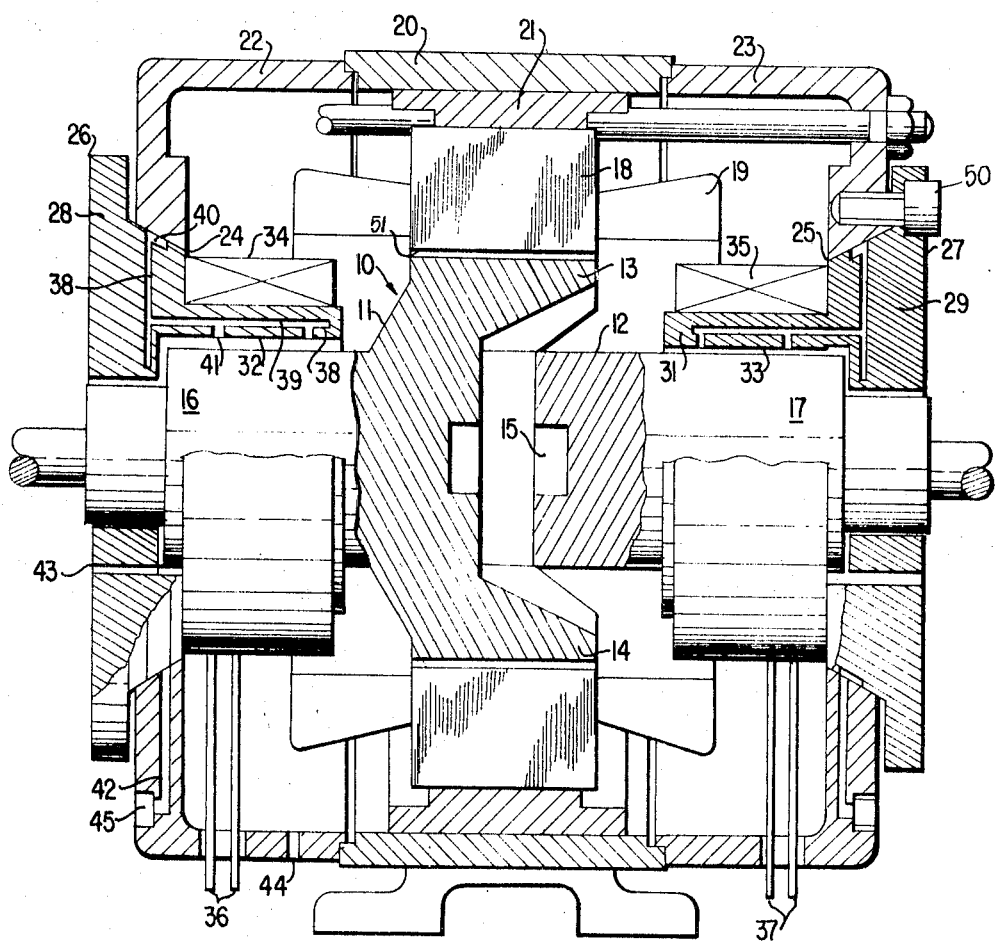
INVENTORS
JUNPEI INAGAKI
HITOSHI MARUMO
BY *Oblon, Fisher & Spivak*
ATTORNEYS

ELECTRIC SYNCHRONOUS MACHINE HAVING A COMB-SHAPED POLE TYPE ROTOR

BACKGROUND OF THE INVENTION

1. Field of the Invention

The present invention generally relates to an electric synchronous machine having a comb-shaped pole type rotor, and more particularly to such a machine wherein the opposite end portions of the rotor are rotatably supported on the end brackets of the machine by a fluid floating means.

2. Description of the Prior Art

It is well known in the art of high speed electric synchronous machines having a comb-shaped rotor to provide the D.C. excitation means for the comb-shaped poles of the rotor on the stationary side of the machine. The purpose is to reduce the size and weight of the rotor. As such, a portion of the magnetic flux generated by the excitation windings will pass through bearings which are preferably constructed on the ball or roller type. While somewhat satisfactory, one of the problems with the prior art machines was that upon the rotation of the balls or rollers within a magnetic field, an electric current by induction may pass through each ball or roller and thereby heat the same. Such a heating effect will cause the life of the ball or roller to shorten due to the annealing and electrolytic corrosion thereof.

One manner of reducing the aforesaid problem is to locate the bearings, which include the steel balls or rollers, further from the excitation means by mounting the same at the remote ends of the rotor shaft. However, in accordance with this arrangement, the axial length of the machine will become larger and thereby unprofitably increase the entire size thereof.

Moreover, when the prior art type synchronous machine is employed in the sea, there is a further problem in that brine may be introduced through the bearings into the machine to damage the electric insulation thereof and thereby corrode its inner parts.

SUMMARY OF THE INVENTION

Accordingly, it is an object of this invention to provide a new and improved unique electric synchronous machine having a comb-shaped rotor wherein the need for bearings including steel balls or rollers to rotatably support the rotor member thereof is eliminated.

Another object of this invention is to provide a new and improved electric synchronous motor having a comb-shaped rotor which may be inserted into the sea without any damage being caused due to brine therein.

Still another object of this invention is to provide a new and improved electric synchronous motor having a comb-shaped rotor which by the elimination of bearings can operate at very high speeds.

A further object of this invention is to provide a new and improved unique electric synchronous machine having a comb-shaped rotor which is easy to construct, compact, and of small size.

One other object of the present invention is to provide a new and improved electric synchronous machine wherein the axially opposite ends of the rotor member are rotatably supported within spools attached to end brackets of the machine and wherein pressurized fluid is ejected into gaps provided between the inner surfaces of the spools and the outer surfaces of the axially opposite end portions of the rotor such that the rotor is rotatably supported in a floating state.

Briefly, in accordance with this invention, these and other objects are, in one aspect, attained by the provision of an electric synchronous machine having a comb-shaped pole type rotor which comprises a stator core having a stator winding. A comb-shaped pole type rotor is rotatably mounted in a bore of the stator core and a pair of cylindrical tubular spool members are respectively secured to end brackets of the machine and positioned around the opposite end portions of the rotor through small gaps provided therebetween. Means are provided for ejecting pressurized fluid into said gaps, such that the rotor axis is maintained along the center axis of the spool members. Exciting coils are positioned around the spool members for generating magnetic fluxes between the pole surfaces of the rotor and the inner surfaces of the stator core.

BRIEF DESCRIPTION OF THE DRAWING

A more complete appreciation of the invention and many of the attendant advantages thereof will become readily apparent as the same becomes better understood by reference to the following detailed description when considered in connection with the accompanying solitary view which illustrates an axial front elevational view, partly in section, of an embodiment of the present invention.

DETAILED DESCRIPTION OF THE PREFERRED EMBODIMENT

Referring now to the Drawing, the electric synchronous machine of the present invention is shown as including a rotor 10 which has a pair of axially separated members 11 and 12. The member 11 has axially extending comb-shaped teeth, or pole pieces, 13 and 14, and similarly the member 12 has a pair of axially extending comb-shaped teeth or pole pieces, not shown, which are positioned between the pole pieces 13 and 14 and engaged therewith. It should be understood that the pair of axially separated members 11 and 12 are mechanically connected by an intermediate member 15 by means of shrink fit an welding processes. The intermediate member 15 is preferably made of a non-magnetic steel in order to magnetically separate the pair of members 11 and 12. Although not shown, the spaces between adjacent pole pieces are cast with a non-magnetic material, such, for example, as aluminum, to form a smooth circumferential surface of the rotor. As is shown, the pair of members 11 and 12, respectively, include boss portions 16 and 17 having a relatively large diameter.

The rotor is positioned for rotation within a bore of a stator core 18 and the same has a stator winding 19 wound thereon. The stator core 18 is fitted into a framework 20 with a ring member 21 positioned therebetween. The ring member 21 is preferably made of a non-magnetic steel in order to magnetically separate the stator core from the framework.

A pair of end brackets 22 and 23 are provided and the same are secured to the axially opposite sides of the framework 20. Each of the end brackets 22 and 23 includes a respective opening 24 and 25 for receiving spool members 26 and 27 of magnetic material therein. The spool members 26 and 27 include respective flanged portions 28 and 29 for fixedly securing them to the end brackets 22 and 23 by bolts 50. The spool members 26 and 27 further include respective axially extending cylindrical tubular portions 30 and 31 which surround the boss portions 16 and 17 of the rotor through small gaps 32 and 33 therebetween. The tubular portions 30 and 31 extend toward the inside of the machine along the axis of the rotor.

To provide D.C. excitation, a pair of exciting coils 34 and 35 are provided and respectively wound around the cylindrical tubular members 30 and 31. Respective lead wires 36 and 37 for the exciting coils 34 and 35 are brought out through openings in the end brackets 22 and 23.

A plurality of fluid paths 38 and 39 are provided within the spool member 26 enabling pressurized fluid to be supplied to the gap 32. The paths 38 radially extend in the flanged portion 28 and communicate with an annular groove 40 provided around a portion thereof. The annular groove 40 abuts, at an inclined angle, against the inner surface of an opening 24 of the end bracket 22. The radial paths 38 are located in an angularly spaced fashion around the rotor axis and communicate with an inlet 45 through a path 42 provided in the end bracket 22. The paths 39 axially extend and communicate with both the radial paths 38 and openings 41 which open to the gap 32. The paths 39 are also located around the rotor axis in an equal angular distribution, such, for example, as 90°, in order to equally eject the fluid into the annular gap 32. A part of the pressurized fluid ejected into the gap 32 is exhausted out through a path 43 provided in the flange 26. The rest of the pressurized fluid ejected into the gap 32 will flow into the inside of the machine and then pass out through an opening 44 of the end bracket 22.

It should be understood that the other spool member 27 has fluid paths therein similar to those of the aforesaid spool member 26. Accordingly, the fluid paths for spool member 27 are shown, but the description thereof is omitted to simplify the explanation.

The operation of the electric synchronous machine described above is as follows. The magnetic fluxes caused by the exciting coils 34 and 35 will pass from the spool member 26 through gap 32, boss portion 16 of member 11, pole pieces 13 and 14 of the member 11, an air gap 51, stator core 18, again through air gap 51, the other pole pieces of member 12, boss portion 17 of the member 12, annular gap 33, the other spool member 27, end bracket 23, framework 20 and bracket 22 to the spool member 26. When the stator coil 19 is then excited by an A.C. voltage source, the machine will operate as a synchronous motor. Of course, it should be apparent that the machine can be operated as an A.C. generator.

During the operation of the machine, a pressurized fluid, which is preferably an electrical insulating oil, is ejected into gaps 32 and 33 through inlets 45 and paths 42, 38, and 39. The pressurized fluid ejected into the gaps 32 and 33 will then pass to the boss portions 16 and 17 of the rotor 10 and thereby maintain the rotor axis along the axial center line of the spool members 26 and 27 and at the same time provide lubrication for the boss portions.

It should be understood that when an electrical insulating oil is employed as the lubricant, a portion of the same can be pressed into the inside of the machine without any danger of the breakdown of insulation thereof. It should also be understood that the oil pressure may be of a value such, for example, as 15 $Kg/cm^2$. However, when the machine is to be used in the sea, the pressure of the oil to be ejected into the gaps 32 and 33 is selected to a value such that when the value of the pressure of the environment is added to the pressure of the oil, brine from the sea will be prevented from entering into the inside of the machine.

Obviously, the present invention is not limited to the use of an electrical insulating oil as the pressurized fluid. Thus, for example, a gaseous medium, such as air, and the like can be employed, if desired, as the fluidic lubricant for the gap. Typically, under such conditions, the air should be pressurized to a pressure in the order of six $Kg/cm_2$.

It should now be apparent that in accordance with the present invention, since the pressurized fluid is equally applied from the spool members around the axially opposite boss portions of the rotor that the axial center axis of the rotor is forced so as to be aligned with the center axis of the spool members. As such, the rotor will continue to rotate in a floating state by the fluid film so provided. Moreover, it should be understood that the friction loss which may occur between the inner surfaces of the spool members and the surfaces of the boss portions of the rotor is negligible. Uniquely, then, with the present invention, since it is not necessary to employ bearings having steel balls or rollers, an electric synchronous machine of long life and capable of rotation with higher speeds can be readily realized.

In addition, it is easily understood that by the elimination of the bearings of the prior art, the axial length of the machine of the present invention can be effectively reduced and thereby a machine of small size be provided.

Also, in accordance with the present invention, it should be understood that when the machine is employed in the sea, provisions are provided so that brine will not enter into the machine through the gaps between the inner surfaces of the spool members and the surfaces of the boss portions of the rotor.

Obviously, numerous modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. An electric synchronous machine having a comb-shaped pole type which comprises:
    a stator core having a stator winding;
    a comb-shaped pole type rotor which is rotatably mounted in a bore of said stator core;
    a pair of cylindrical tubular spool members respectively secured to end brackets of said machine, said spool members being positioned around the axially opposite end portions of the rotor through small gaps provided therebetween;
    means for ejecting pressurized fluid into said gaps to thereby cause the rotor axis to be maintained along the center axis of the spool members; and,
    exciting coils positioned around the spool members for generating magnetic fluxes between the pole surfaces of the rotor and the inner surface of the stator.

2. An electric synchronous machine having a comb-shaped pole type rotor according to claim 1, wherein:
    said fluid to be ejected into the gaps between the inner surfaces of the spool members and the surfaces of the axially opposite end portions of the rotor is a pressurized electrical insulating oil, a portion of which is introduced into the inside of said machine and then is exhausted out therefrom.

3. An electric synchronous machine having a comb-shaped pole type rotor according to claim 1, wherein:
    said fluid to be ejected into the gaps between the inner surfaces of the spool members and the surfaces of the axially opposite end portions of the rotor is a pressurized gaseous medium.

4. An electric synchronous machine having a comb-shaped pole type rotor according to claim 1, wherein:
    said pressurized fluid is ejected from the inner surfaces of the spool members to the axially opposite end portions of the rotor so as to cause the axial center axis of the rotor to be maintained along the axial center axis of said spool members.

5. An electric synchronous machine having a comb-shaped pole type rotor according to claim 1, wherein
    said magnetic fluxes generated by said exciting coils positioned around the spool members are passed through said gaps provided between the inner surfaces of said spool members and the axially opposite end portions of said rotor and then are fed between said pole surfaces of said rotor and the inner surface of said stator.

6. An electric synchronous machine having a comb-shaped pole type rotor according to claim 1, wherein said means for ejecting pressurized fluid into said gaps includes:
    an inlet provided within each of said end brackets,
    a plurality of radial paths located within said spool members in an angularly spaced fashion around the rotor axis and in communication with said inlets, and,
    a plurality of paths located within said spool members in an angularly spaced fashion and axially extending and communicating with said radial paths and a plurality of openings which open to said gaps.

* * * * *